(12) United States Patent
Bloomfield

(10) Patent No.: US 6,857,007 B1
(45) Date of Patent: Feb. 15, 2005

(54) PERSONAL DIGITAL ASSISTANT FACILITATED COMMUNICATION SYSTEM

(75) Inventor: Mark C. Bloomfield, Marietta, GA (US)

(73) Assignee: Bloomfield Enterprises, LLC, Ponte Vedra, FL (US)

( * ) Notice: Subject to any disclaimer, the term of this patent is extended or adjusted under 35 U.S.C. 154(b) by 229 days.

(21) Appl. No.: 09/723,349

(22) Filed: Nov. 27, 2000

Related U.S. Application Data

(60) Provisional application No. 60/229,317, filed on Aug. 30, 2000.

(51) Int. Cl.$^7$ .............................................. G06F 15/16
(52) U.S. Cl. ...................... 709/206; 709/217; 709/207; 709/203; 709/218; 358/402
(58) Field of Search ................................. 709/203, 206, 709/207, 218, 217; 358/402, 442; 379/100.01, 100.08

(56) References Cited

U.S. PATENT DOCUMENTS

| | | | |
|---|---|---|---|
| 4,837,798 A | 6/1989 | Cohen et al. .................. | 379/88 |
| 4,941,170 A | 7/1990 | Herbst ......................... | 379/100 |
| 5,291,302 A | 3/1994 | Gordon et al. .............. | 358/400 |
| 5,299,255 A | 3/1994 | Iwaki et al. .................. | 379/96 |
| 5,339,156 A | 8/1994 | Ishii ............................ | 358/402 |
| 5,384,835 A | 1/1995 | Wheeler et al. .............. | 379/96 |
| 5,386,297 A | 1/1995 | Tanaka et al. ............... | 358/402 |
| 5,406,557 A | 4/1995 | Baudoin ....................... | 370/61 |
| 5,438,611 A | 8/1995 | Campana, Jr. et al. ........ | 379/58 |
| 5,508,817 A | 4/1996 | Kunigami .................... | 358/402 |
| 5,548,789 A | 8/1996 | Nakanura .................... | 395/853 |
| 5,555,100 A | 9/1996 | Bloomfield et al. ......... | 358/402 |
| 5,559,721 A | 9/1996 | Ishii ......................... | 364/514 A |
| 5,608,786 A | 3/1997 | Gordon ....................... | 379/100 |
| 5,675,507 A | 10/1997 | Bobo, II ................. | 364/514 A |
| 5,712,907 A | 1/1998 | Wegner et al. .............. | 379/112 |

(List continued on next page.)

FOREIGN PATENT DOCUMENTS

| | | | | |
|---|---|---|---|---|
| EP | 0 465 011 | | 1/1992 | ............ H04N/1/32 |
| EP | 0 504 884 | | 9/1992 | ............ H04N/1/00 |
| EP | 0 615 377 | | 9/1994 | ............ H04N/1/32 |
| FI | 0615377 A2 | * | 3/1994 | ............ H04N/1/32 |
| WO | WO 96/41463 | | 12/1996 | ............ H04N/1/00 |
| WO | WO 97/10668 | | 3/1997 | ............ H04N/1/00 |
| WO | WO 98/17041 | | 4/1998 | |

OTHER PUBLICATIONS

Development of Public Facsimile Communication System Using Storage & Conversion Techniques—T. Kamae—pp. 19.4.1–19.4.5–1980.

Fax–4–Less Infrastructure Guidelines–1–Line Worldwide Inc.—Jun. 4, 1996.

FaxServe Product Information by Cheyenne InfoFax—pp. 1–15—Prior to May 30, 1997.

(List continued on next page.)

*Primary Examiner*—Zarni Maung
*Assistant Examiner*—Kevin Parton
(74) *Attorney, Agent, or Firm*—Womble Carlyle Sandridge & Rice PLLC

(57) ABSTRACT

A bifurcated interface is disclosed, including apparatus and methods/processes, for integrated use in a fax-to-email system, and further comprises the further disclosed is an enhanced communication system, including apparatus and methods, which results from the integration in the fax-to-email system of the bifurcated interface. The bifurcated interface provides an alternative or additional method for command entry to the interface of a fax-to-email system through a remote, commercially available, personal digital assistant or like device ("PDA") modified by software to perform functions of the present invention. The interface of the enhanced communication system is bifurcated having a portable traveler portion, embodied by the programmed PDA, and a host portion in a more permanent connection with the fax function of the fax-to-email system.

28 Claims, 15 Drawing Sheets

U.S. PATENT DOCUMENTS

| | | | | |
|---|---|---|---|---|
| 5,805,298 A | | 9/1998 | Ho et al. | 358/402 |
| 5,872,845 A | | 2/1999 | Feder | 358/442 |
| 5,881,064 A | | 3/1999 | Lin et al. | 370/395 |
| 5,999,274 A | | 12/1999 | Lee et al. | 358/434 |
| 6,020,980 A | | 2/2000 | Freeman | 358/402 |
| 6,023,345 A | | 2/2000 | Bloomfield | 358/402 |
| 6,028,679 A | | 2/2000 | Murphy | 358/407 |
| 6,101,397 A | * | 8/2000 | Grob et al. | 455/557 |

OTHER PUBLICATIONS

Centigram & Lucent deploy VPIM protocol for exchanging voice & fax messages over the internet—Yahoo Finance—Apr. 23, 1997.

Fax 2 Net Sends Faxes over the Internet—Fax Focus Newsletter—Jun. 10, 1997—vol. 17 Issue 21.

Fabrik Fax, an E–mail–To–Fax Service—Fax Focus Newsletter—Jun. 10, 1997—vol. 17 Issue 21.

Lumina Office Products Introduces Internet Fax Software Internet Fax Utility Offers Simplified Faxing to E–Mail Addresses—Sep. 3, 1996.

Biscom Introduces the E–Fax Machine, the E–Mail/Facsimile Solution "for the rest of us" Sep. 19, 1996.

ScanFX–Scanning Hardware for Internet E–Mail—OBM's Editorial Resource Chest Irwindale, CA—Aug., 1996.

F@x Mate Fax To E–Mail Service: The Basics . . . —Prior to Sep. 18, 1997 (some prior to Jun. 8, 1997).

AT&T Intorduces Most Comprehensive Fax–To–Data Service Feb. 22, 1996—2 pages.

Fax Fee Portal 100 Fax Machine Internet Interface TAC Systems, Inc.

BISCOM The Messaging Machine, the "e–fax" Model Strategic Overview—Prior to 11/96.

JFax Personal Telecom—Extra Press Extra—Oct. 31, 1996—pp. 1 of 2 and 2 of 2.

JFax Personal Telecom—Plug A Phone Into Your E–Mail Oct. 31, 1996—pp. 1–3.

JFax Personal Telecom—Frequently Asked Questions Oct. 31, 1996—pp. 1–3.

IBM Announcement letters (US)—Document 295 . . . Microsoft Internet Eagle—Nov. 12, 1996 22 pages.

Nigel Ballard @ The Paperless Office Oct. 31, 1996—pp. 1–2.

Cyber Times—German Pop Singer Sets Sights on Virtual Office—Sep. 23, 1996—pp. 1–4.

FaxWeb—Microsoft Internet Explorer—Nov. 12, 1996—1 page.

Digital Note Net 2 Fax R5S1—Microsoft Internet Explorer—p. 2 of 4—Oct. 31, 1996.

Digital Note Fax 2 Net R5S1—A Beginner's Guide to Digital Mail Fax 2 Net—Oct. 31, 1996 pp. 1–10.

IBM—How to Set Up Your Direct Talk Mail Box Nov. 12, 1996—1 page.

First Global Fax and Voice to E–Mail Network Launched for Internet Users—JFAX Press Information—Apr. 30, 1996—pp. 1–2.

IBM Link/Info.Link—IBM Software Allows Phone Messages To Be Retrieved Via Internet World Wide Web 1995. Handbook for the Palm V Organizer—3Com—Copyright 1998—pp. 1–243.

* cited by examiner

PERSONAL DIGITAL ASSISTANT FACILITATED COMMUNICATION SYSTEM

CROSS-REFERENCE TO RELATED APPLICATIONS

This application claims the benefit of 60/229,317, filed Aug. 30, 2000.

FIELD OF THE INVENTION

The present invention relates generally to the field of communications associated with the communication of facsimile messages and associated with the uniting of traditionally distinct message delivery systems such as facsimile delivery and electronic mail delivery.

BACKGROUND

In earlier patent applications, this inventor has described a Facsimile-to-Electronic mail communication system (also referred to herein as a "fax-to-email system") (and species embodiments thereof) whereby a facsimile transmission originating at a facsimile device is delivered to its recipient via electronic mail (such as through the "Internet") rather than via another facsimile device. Those prior applications include U.S. patent application Ser. No. 08/937,124, now U.S. Pat. No. 6,023,345, the specification and drawings of which are incorporated herein in their entirety by this reference, and U.S. (PCT) application Ser. No. PCT/IB97/01455, filed Oct. 7, 1997, the specification and drawings of which are incorporated herein in their entirety and, also by pending U.S. application Ser. No. 09/364,342, filed Jul. 30, 1999, and pending U.S. application Ser. No. 09/235,566, filed Jan. 22, 1999, the specification and drawings of each of which are also incorporated herein in their entirety by this reference. The aforementioned documents are collectively referred to herein as the "Incorporated Documents." The fax-to-email system of those earlier applications, as is generically taught by and understood by reference to the Incorporated Documents, is schematically represented in FIG. 1 hereof. The fax-to-email system 100 of FIG. 1 is shown as comprising sender-side fax and interface functions 99, a first communication network 98, a facsimile-to-e-mail server 104 (also referred to herein as the "FEM-GATEWAY 104"), a second communication network 97, and receiver-side e-mail handling functions 96. In the rapidly changing environment of communications, telecommunications, networking, and the Internet, the first communication network 98 and second communication network 97 may take on numerous and various forms while remaining acceptably within the scope of the Incorporated Documents. Various forms of these networks are those represented in the Incorporated Documents. The system comprises and the processes are facilitated by a software-based interface including, by way of example but not limitation, interfaces of the types described in the Incorporated Documents.

The sender-side fax and interface functions 99 comprise a facsimile function, typically in the form of a fax device such as a standard, stand-alone, hardcopy fax machine, or a general purpose computer outfitted with faxed software and a fax modem, or other specialty computer and software-based devices which output to a network in a format and protocol typically understood in the industry to be a fax format and fax protocol. The sender-side fax and interface functions 99 also include, in accordance with the system of the Incorporated Documents, an interface which provides the sender-side 99 with at least the functionality of initiating communication between the FEM-GATEWAY 104 and the sender-side functions 99 (thereby initiating a communication between a server at the FEW GATEWAY and the fax device (or fax function) of the sender-side), and accepting and transmitting via the first communication network a destination address associated with a destination along the second communication network. The interface is primarily software driven and utilizes necessary hardware (for example, input device, display device, CPU, memory, wiring, and chassis) either separate from or shared with the hardware of the facsimile function. In conjunction with at least one of the embodiments of the Incorporated Documents, the interface is almost totally software embodied and resident on computer memory within the fax device (e.g., combined fax and interface device). Sender-side fax and interface functions 99 include, but are not limited to exemplary embodiments shown in the Incorporated Documents, which various arrangements include "in-parallel" separate interface and fax device, integrated fax and interface functions within a single case, sharing hardware and representing a software embodied interface function, and "in-series" separate fax device and interface. (Refer to the Incorporated Documents).

The FEM-GATEWAY 104 receives a signal from and communicates with the interface function of the sender-side 99 via the first communication network 98, in accordance with a proprietary protocol, and receives from the sender-side fax function fax image data transported along the first communication network 98, in accordance with a fax protocol. The FEM-GATEWAY 104 receives an e-mail address and the fax image data from the sender-side functions 99, creates an e-mail message (including a "canned" text) addressed to the received e-mail address, attaches the fax as an attachment to the email message and sends the fax/e-mail message along the second communication network 97 to the received e-mail address using the protocol of the second network (for example, an email protocol). The fax (as an email attachment) is received at, for example, a mailbox from which the e-mail message with the attached fax image data may be reviewed or otherwise handled by an appropriate, authorized "receiver" using receiver-side functions 96. A detailed explanation and understanding of these processes is had by reference to the Incorporated Documents.

The sender-side functions of the system of the Incorporated Documents provide for both fax-to-email delivery and fax-to-fax delivery. The fax-to-email delivery, as mentioned above, comprises automatic initiating by the sender-side interface function 99 of communication along the first communication network 98 with the FEM-GATEWAY 104, transmission of the sender-entered email address to the gateway server using proprietary protocol, faxing of a document via a fax protocol to the gateway server, and transmitting the faxed document along the second communication network to the destination of the received email address using an email protocol. The fax-to-fax delivery comprises initiating by the sender-side (fax) function 99 communication with a sender-entered destination (for example, dialing the telephone entered by the sender at the sender-side functions) and communicating using a fax protocol with a fax device (or proxy system) 106r at the sender-entered address along the first communication network.

SUMMARY OF THE INVENTION

Briefly described, the present invention comprises a bifurcated interface, including apparatus and methods/processes, for integrated use in a fax-to-email system, and the invention further comprises the enhanced communication system, including apparatus and methods, which results from the integration in the fax-to-email system of the bifurcated interface. In accordance with the present invention, the bifurcated interface provides an alternative or additional method for command entry to the interface of a fax-to-email system through a remote, commercially available, personal digital assistant or like device (all such devices currently known or developed hereafter being collectively referred to herein as "personal data assistant" or "PDA") modified by software to perform functions of the present invention. Delivery of commands, and other data, from the PDA is made, preferably, via infrared signals, but, alternatively, by direct cable syncing and other techniques known to those in the PDA field. Thus, the interface of the enhanced communication system of the present invention is bifurcated having a portable traveler portion (also referred to herein as the "interface traveler" or "traveler"), embodied by the programmed PDA, and a host portion (also referred to herein as the "interface host" or "host") in a more permanent connection with the fax function of the fax-to-email system. The PDA, when loaded with and operating the software in accordance with the present invention, functions as the interface traveler portion, and becomes (at least temporarily) a specially programmed data entry tool with command communicating ability and a protocol shared by (or matched to) the interface host portion.

In accordance with the present invention, a user (sender) can proarrange his tasks by entering into the traveler portion email addresses and custom text for email messages while away from the fax device/function, and can later dispatch to their respective recipients these pre arranged e-mails with, as appropriate, corresponding image data of the hardcopy documents. In accordance with some embodiments of the invention, the user (sender) can enter at the interface traveler (PDA) either or both of email addresses for destinations on the second communications network and/or telephone numbers of fax destinations on the first communications network (e.g., the public switched telephone network), and upon transmission of the addresses/numbers to the interface host, the host will selectively provide for delivery of the fax from the fax device/function to an email system (through, for example, a fax-to-email system) or prepare the fax function for transmission of the fax to the telephone number received from the interface traveler (referred to herein as a fax-to-fa transmission). As previously mentioned, fax-to-fax transmission is understood to be transmission to line/link associated with a telephone number (or other destination address), with the expectation of delivery via fax protocol to a fax device or its proxy.

In accordance with the communication system aspect of the present invention, the system includes a delivery system for accomplishing fax-to-email transmission, and, alternately, also fax-to-fax transmission. In accordance with at least one embodiment of the enhanced communication system of the present invention, the communication system includes a first communications network, a FEM-GATEWAY, second communications network which function similarly to those components disclosed in the Incorporated Documents, and modified as will be apparent from this disclosure to accomplish the added features of the present invention.

The bifurcated interface and the enhanced communication system, in accordance with various embodiments of the present invention, provide for and accomplish, at least and without limitation:

i. the entry of data to the "interface" at a portable device, reasonably unconstrained by location or time;

ii. the entry of data associated with a plurality of fax-to-email tasks, reasonably unconstrained by location or time;

iii. the flexibility of communicating prearranged fax-to-email tasks or fax-to-fax tasks or both to any one of a plurality of interface hosts (e.g., at a plurality of separate locations);

iv. the simultaneous creation at multiple, separate interface travelers of fax-to-email tasks or fax-to-fax tasks or both by multiple users (senders), who can then sequentially (or, alternately, simultaneously) communicate those tasks to a single interface host;

v. the transmission of a document, which begins as a hardcopy, from a fax enabled device to a forwarding facility via facsimile protocol and the delivery of the document as an electronic file to an email address entered at a PDA;

vi. the delivery, to an email address entered at a PDA, of an email message containing a faxed document as an attachment and containing custom text entered at the PDA vii. the transmission of custom text and of an email address, each entered at a PDA, to a server across a first communication network and during a single communication session on that first network, and the creation at the server of an email message containing the custom text, and transmission of the email message from the server to the email address;

viii. the option of entering data into the interface at a portable device (i.e., the interface traveler) or at an input device more permanently associated with the interface host.

Numerous features, objects and advantages of the present invention in addition to those mentioned or implied above, will become apparent upon reading and understanding this specification, read in conjunction with the appended drawings.

DETAILED DESCRIPTION OF THE PRESENT INVENTION

Figure 1:
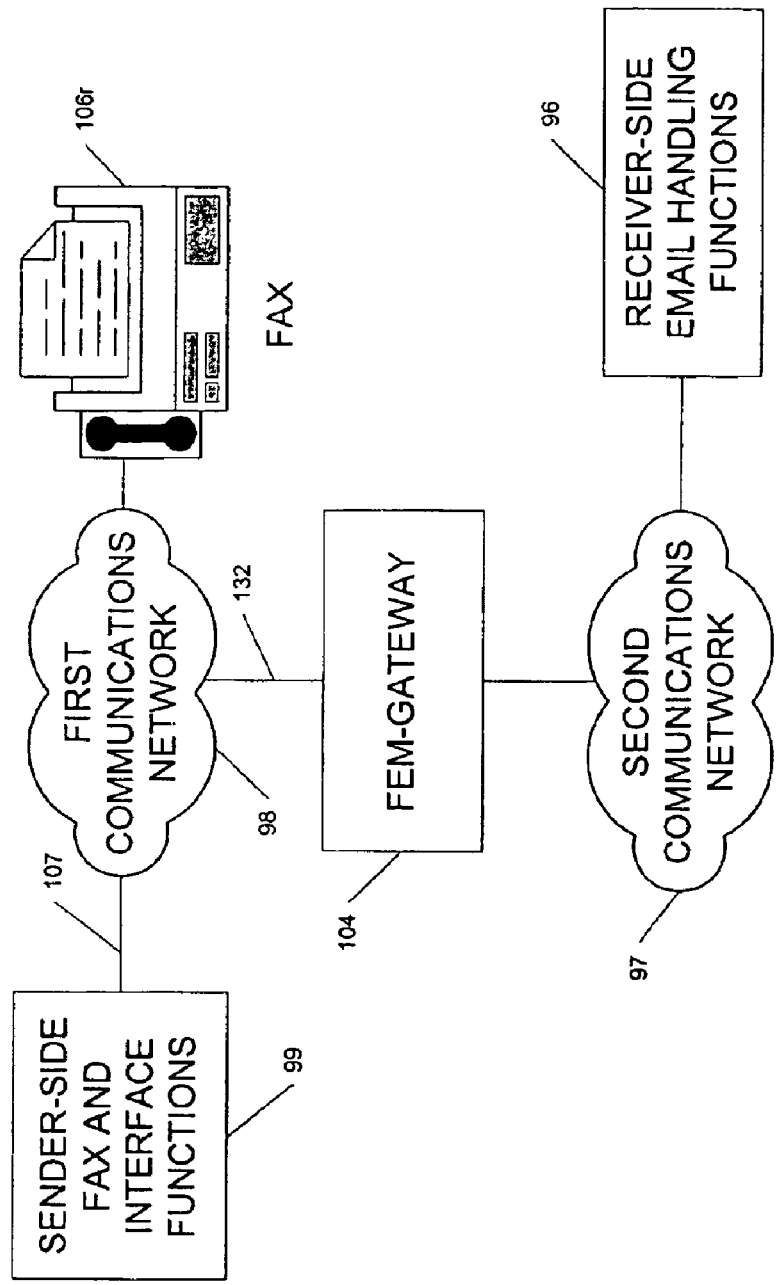
FIG. 1 is a schematic block diagram of fax communication system as generically disclosed in the Incorporated Documents.

Refer now in greater detail to the drawings in which like numerals represent like components throughout the several views and in which lower letter reference numeral suffixes or prime (') markings differentiate similar (though not necessarily identical) components referred to collectively without such suffixes or prime markings. It will be noted that much of the reference numeral selection in the present drawings conforms with the reference numeral selection in the Incorporated Documents, and like numerals represent like components in the present specification and in the Incorporated Documents, in order that reference might be easily had to similar (though not necessarily identical) components and operations.

Figure 2:
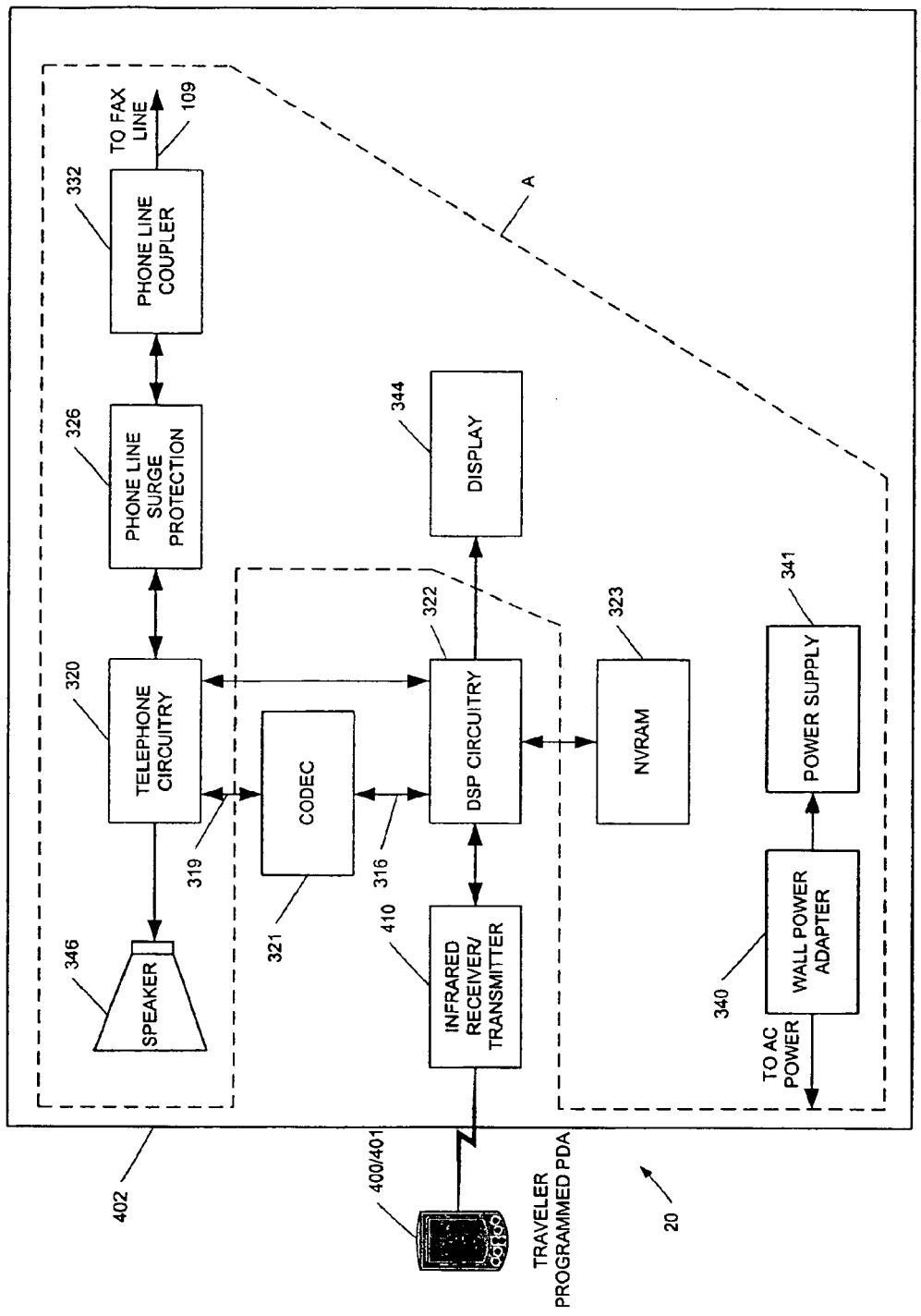
FIG. 2 is a schematic block diagram of one embodiment of a bifurcated interface in accordance with the present invention.
Figure 3:
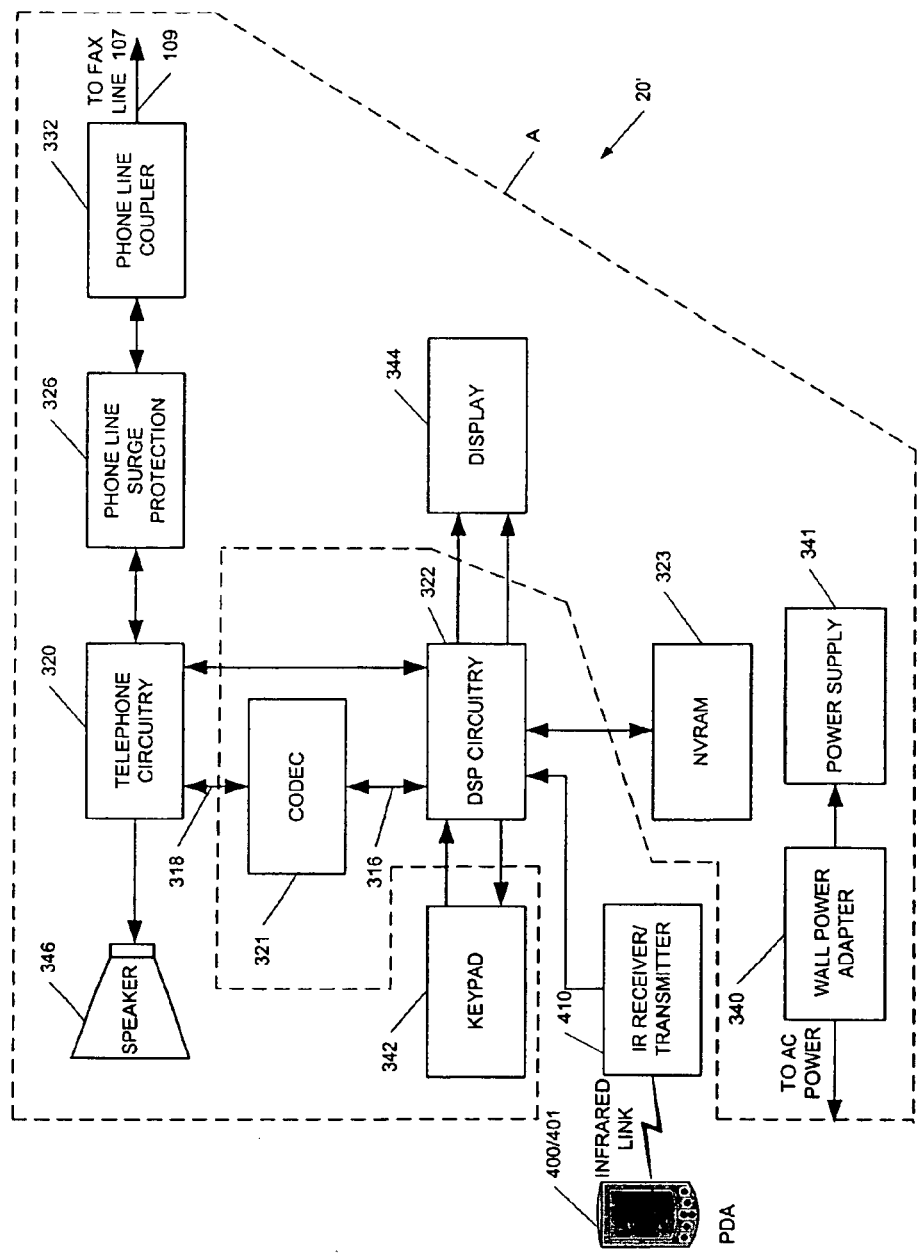
FIG. 3 is a schematic block diagram of a second embodiment of a bifurcated interface in accordance with the present invention.

FIGS. 2 and 3 depict alternate, exemplary embodiments of the bifurcated interface 20 of the present invention. The bifurcated interface 20 of the exemplary embodiments is divided into a portable interface traveler portion 401 and a host traveler portion 402 physically linked to or integrated with the fax function 106 (as respectively depicted in FIGS. 4 and 5). The traveler portion 401 functions as the input device for the interface 20 and is depicted in this embodiment as being embodied as a PDA (Personal Digital Assistant) which is loaded with software so as to selectively operate in accordance with the present invention. When the traveler portion 401 software is active on the PDA, the traveler portion is comprised of and utilizes the common features of the PDA, such as data entry pad or keyboard and screen, communications links, data transmission components, address book, and other features to accomplish the traveler portions functions as the input device for the interface 20, as is detailed below. The PDA is acceptably any commercially available personal digital assistant device to which the custom traveler portion program may be uploaded, such as the "Palm Pilot"™ from Palm Inc, "Jornada" from Hewlett/Packard, the "Visor" from Handspring, and others. Input (including entry of instructions) to the interface is accomplished at the traveler portion 401 through the use of a keyboard, "electronic pencil," voice recognition, or other manner now or later known to the computer industry.

Referring again to FIG. 2, the interface host portion 402 is shown in a schematic block diagram form. It will be noted that each component, except for the infrared Receiver/Transmitter 410, inside the interface host portion 402, has similar function to the corresponding equipment described in the Incorporated Documents. Besides connecting to a CODEC 321, a Display 344, a telephone circuitry 320, and to a non-volatile memory 323, the DSP circuitry 322' is connected to an infrared receiver/transmitter 410. The DSP circuitry 322' has the additional function of cooperating with the infrared receiver/transmitter 410 to provide protocol interaction with the traveler portion 401 to accomplish communication and data sharing. The infrared receiver/transmitter 410 receives destination e-mail addresses and e-mail message data from the PDA 400, and sends acknowledgement signals to the PDA 400. The commands to the bifurcated interface 20 are entered through the PDA 400 (programmed as the traveler 401) and sent through infrared signals (or other linking techniques) to the infrared receiver/transmitter 410. In an alternate embodiment as depicted in FIG. 3, the interface host portion 402 has both a keypad 342 and the infrared receiver/transmitter 410, and the user can input commands and instructions through either the keypad 342 or the PDA 400 (traveler 401).

Whereas this disclosure depicts certain embodiments of the host portion 402 of the interface 20, it is understood that other embodiments are acceptable, including, without limitation, any or all of the various embodiments disclosed in the Incorporated Documents, modified as would be understood by reference to the present disclosure to accomplish the present invention.

Figure 4:
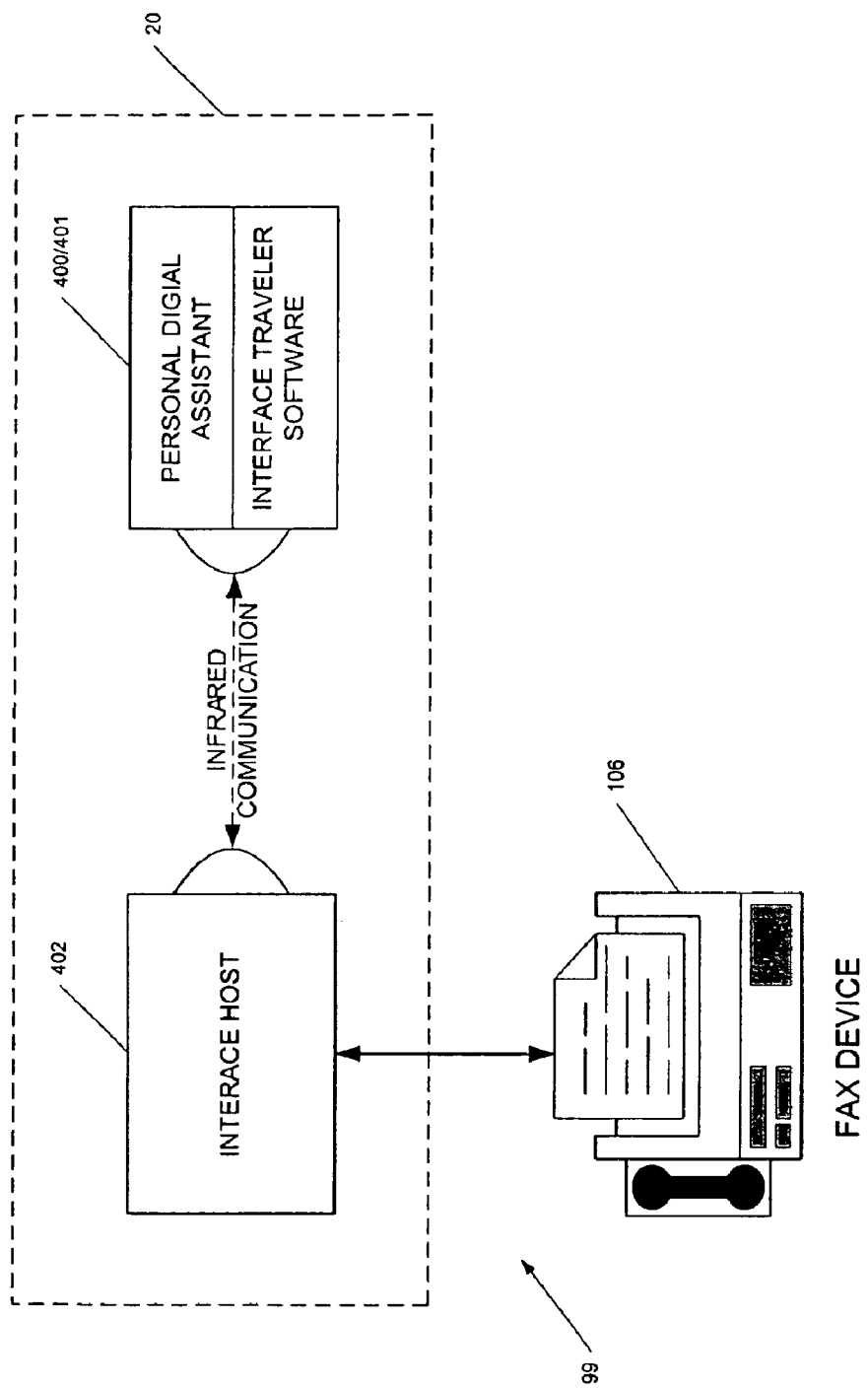
FIG. 4 is an isolated schematic block diagram of the sender-side fax and interface functions of an embodiment of the present invention.
Figure 5:
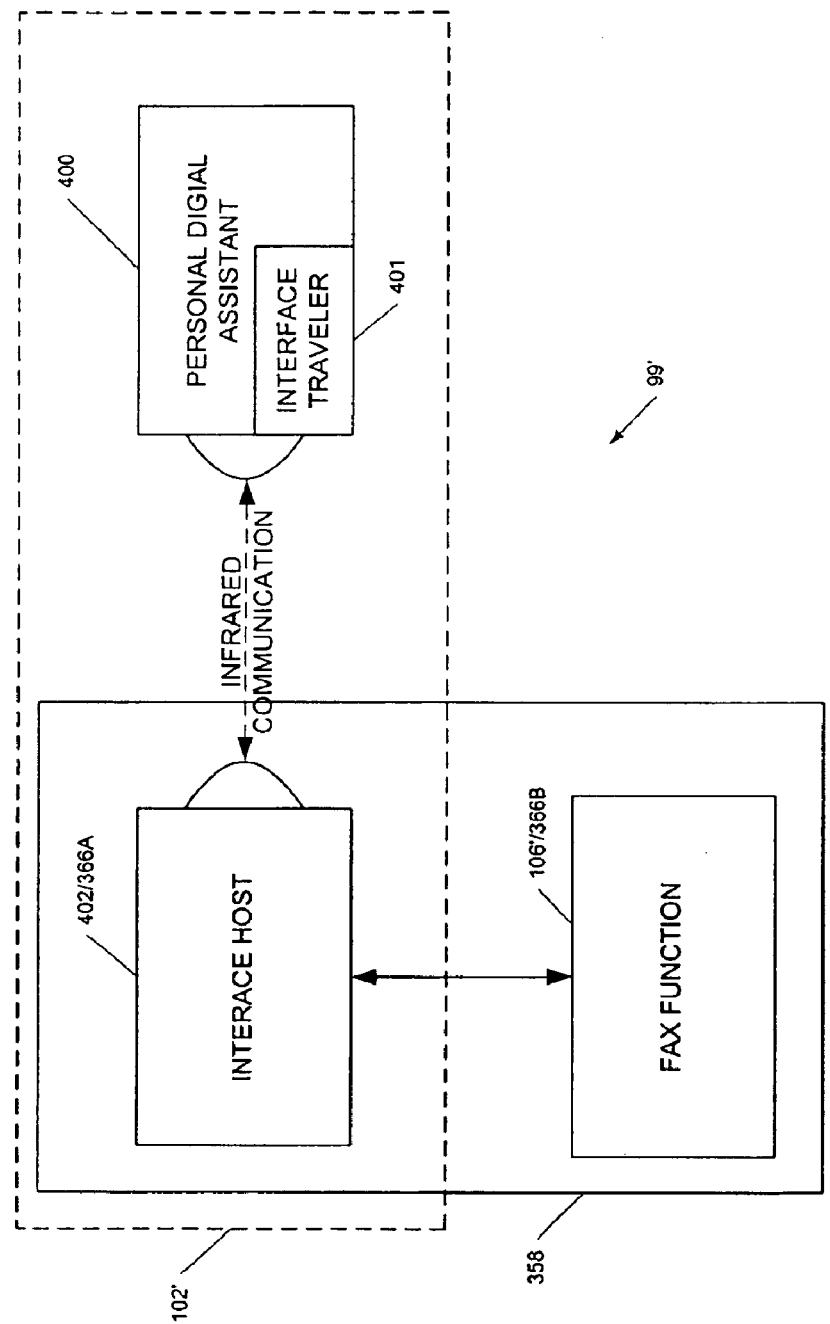
FIG. 5 is an isolated schematic block diagram of the sender-side fax and interface functions of a second embodiment of the present invention.

With reference to FIGS. 4 and 5, the interface 20 is associated with a fax function 106, and both functions 20, 106 comprise the sender-side functions 99. The sender-side functions 99 connect to first communication network 98 through a common communication line or link 107. FIG. 4 shows an embodiment in which the fax function 106 and interface host portion 402 occupy separate chassis are physically link, for example, by cable or a phone line extension. By way of example, the host portion of FIG. 3 or FIG. 4 is acceptably provided as the host 402 of FIG. 4, and, for example but not limitation, a standard, stand-alone fax machine is acceptably provided as the fax function 106, in which case the separate interface host and the fax function are connected "in parallel" to the communication line 107 (as will be understood by reference to the Incorporated Documents"). Connection of the physically separate interface host 402 (involving a different embodiment than that of FIGS. 4/5) and fax function 106 is acceptably by an "in-series" connection to the communication link 107.

Figure 8:
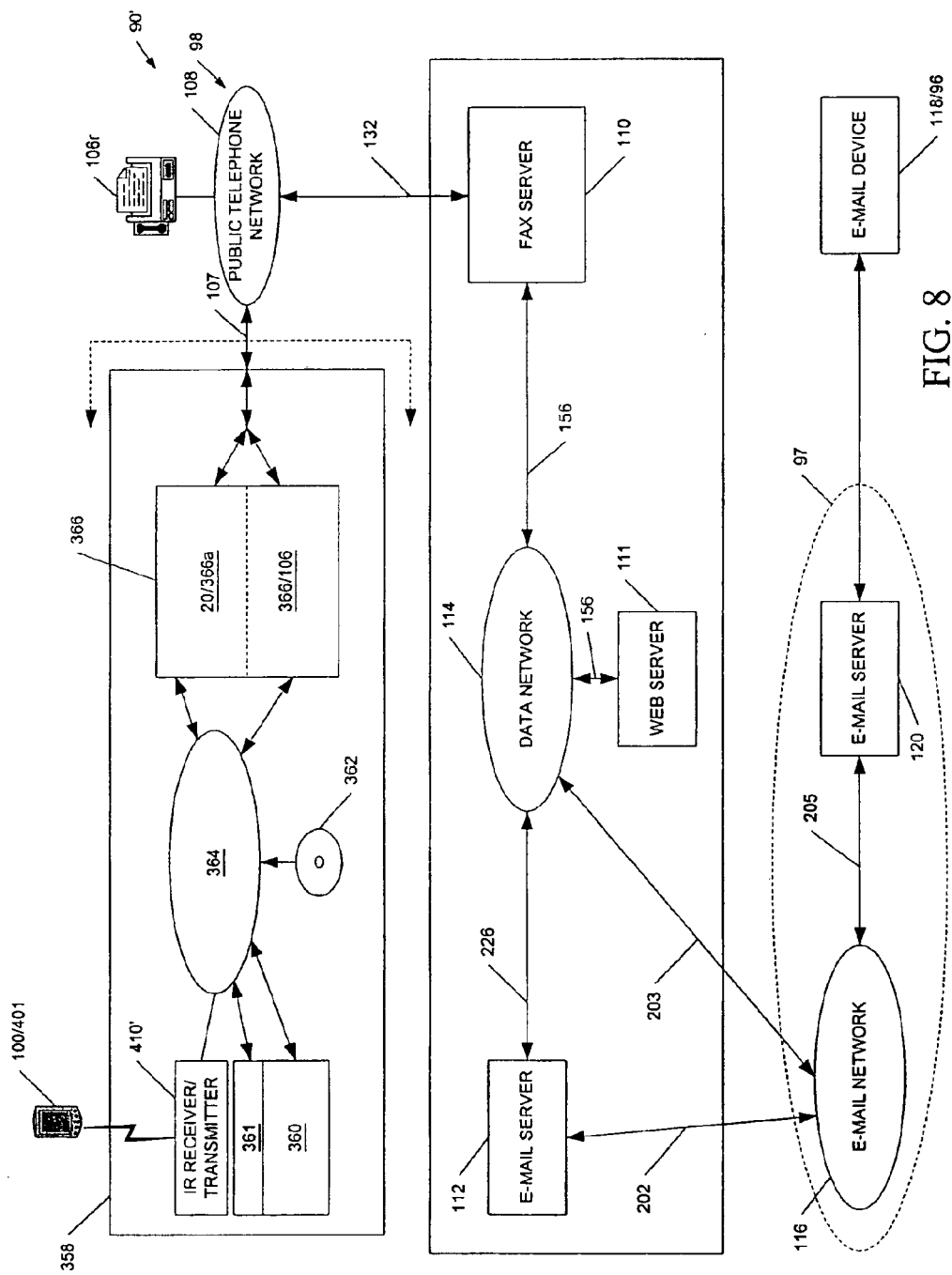
FIG. 8 is a schematic block diagram of a second embodiment of an enhanced communication system in accordance with the present invention.

FIG. 5 shows an embodiment in which the fax function 106'/366b' and the interface portion 402/366a' are integrated and occupy the same chassy as, for example, a single fax/fax-to-email unit 358. An example, without limitation, of such an integrated unit 358 is that shown in FIG. 8 of this disclosure. In such an embodiment, the host portion does not require all of the components shown, for example, in FIGS. 2 and 3, since the fax function 106/366b and interface host portion 402/366a share many common components. Sections surrounded by dashed lines (identified by "A") in FIGS. 2 and 3 represent parts shared and not unique to the interface 20 in integrated sender-side fax and interface functions, and which might not be repeated in the integrated unit 358. Furthermore, in some such integrated embodiments, the remaining interface host functions of the Codec 321 and DSP Circuitry 322 are primarily software enabled on existing fax devices or on specialized fax/fax-to-email devices. With further reference to FIG. 8, the integrated 358 of this depicted, exemplary embodiment includes both the traveler portion 401 and the direct input devices (keypad 360 and display 361). It is understood that at alternate embodiment is anticipated having only a properly programmed the traveler 401 as an input device to a integrated unit 358 which is programmed to receive input for both the fax and interface function at the traveler. The button 362 has the function of switching the integrated unit 358 between the fax-to-fax mode and the fax-to-E-mail mode. In an alternate embodiment, the switch is made by the host 402 in recognition of the address received from the traveler 401 as being either a first network address (for example, a telephone) or a second network address (for example, an email address.

Figure 6:
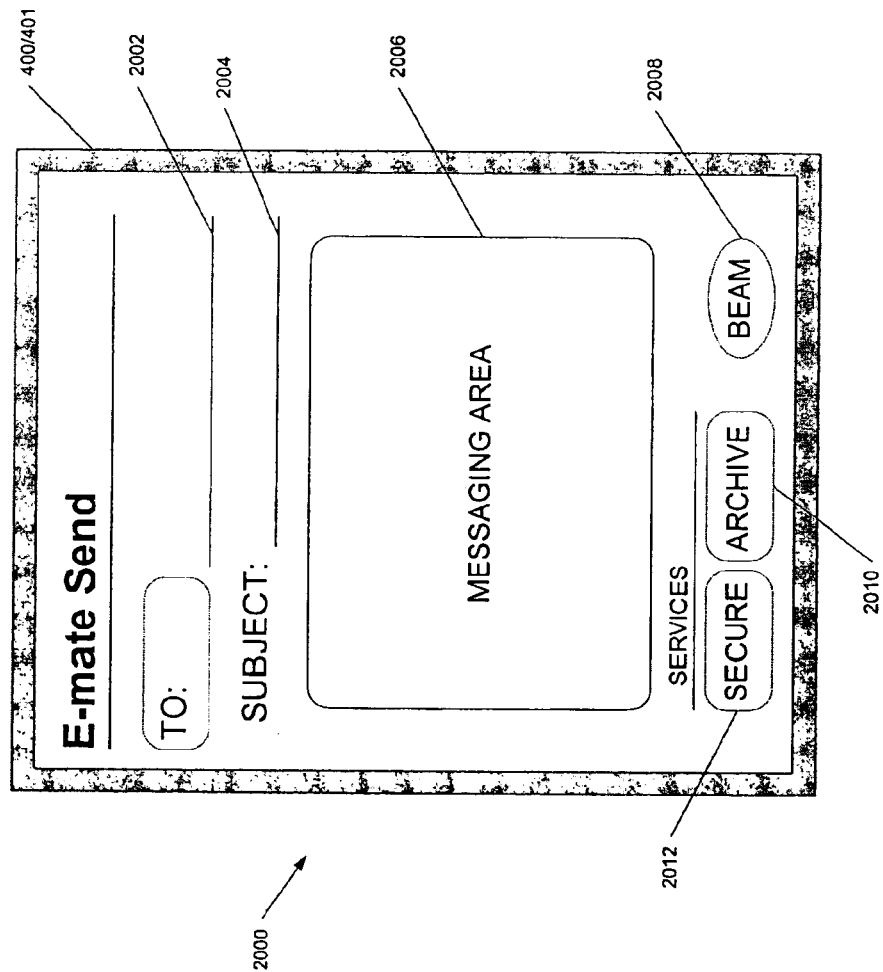
FIG. 6 is an example of an input screen on a personal digital assistant

FIG. 6 is an illustration of one example of an input screen 2000 on the PDA 400 (operating as the interface traveler 401). (The drawing example uses the trademark "Emate", but is not a limiting term.) The user can specify the recipient, by entering at the "To:" field the destination address 2002 (which, for example, can be an email address or a telephone number for a fax machine/proxy), and the "Subject" 2004. Destination addresses can be taken from entries previously created in the PDA's standard "Address Book" or similar PDA application. The destination address is acceptably a broadcast list which is created in the PDA's "Address Book" or directly entered at the traveler's screen, using, for example, "semi-colon" delimiters. Text for an email message can be (optionally) entered in the messaging area 2006. The information entered at the traveler screen as, for example, shown in FIG. 6, identifies a single "task". After entering the information for a task, the user has the option of sending the information immediately to the receiving host 402 by pressing the "beam" button 2008 or saving it for later transmission by pressing the "Archive" button 2010. The user has the option of transmitting the information in a secure mode [for example, encrypted using readily available encryption algorithms such as provided by RSA, Inc.] by pressing the "Secure" button 2012.

The infrared communication between the PDA 400 and the infrared receiver/transmitter 410 follows, in accordance with one exemplary embodiment, the Serial Infrared Link Access Protocol (IrLAP), as would be understood by those skilled in the art. The traveler portion 401 includes a software application that runs on a PDA 400 and interfaces with users through the PDA. The PDA, with its native PDA hardware and software, and loaded with and operating under the traveler software, becomes, in accordance with one embodiment, the traveler portion 401. In at least one exemplary embodiment, the interface host 402 acts as the secondary device, while the interface traveler 401 (e.g., programmed FDA 400) acts as the primary device, and the interface traveler 401 controls the physical channel communication between itself and the interface host 402. The traveler 401 and host 402 utilize standard protocol related commands (for example, but not limitation, to establish the connected/unconnected state of the connection between the traveler and host), as well as interface-specific protocol (for example, but not limitation, data stream order, meaning of data bytes, command/response byte interpretation). A plurality of optional or alternate access schemes are provided within exemplary embodiments, including but not limited to the following: (i) the traveler 401 and host 402 can each have an identification number, in order to promote interaction between only selected traveler-host combinations; (ii) only the host 402 has a unique ID, and any traveler 401 users who know the host ID can link; (iii) each traveler 401 (or user) has a unique ID and a plurality of travelers, each with a unique ID can gain access to the same host 402; or (iv) the host has a generic ID, to allow linking by any traveler 401.

Once connection is made between a traveler 401 and host 402, data and commands are exchanged. According to one example, without limitation, the communication between a PDA 400 (traveler 401) and an interface host 402 can be described as follows:

1. PDA/Traveler 401 transmits the following data:
   a. Request for service command
   b. E-mail address or other ID of the sender
   c. Destination address(s) of recipients
   d. Subject text data
   e. E-mail message text data
   f. Additional service request command (secure, archive)
   g. End of message
2. Host 402 sends an acknowledgement (ack) of receipt or request for re-send:
   a. Host 402 provides a distinctive visual or audio indicator during data receive process;
   b. Host 402 provides a distinctive visual or audio indicator for complete transmission;
   c. Host 402 provides a distinctive visual or audio indicator for failed or incomplete transmission.

In accordance with one embodiment, upon completion of the transfer of data to the host 402, the traveler 401 sends a command to the host to initiate (or, alternately, the host recognizes completion and automatically initiates) execution of the task by initiating a network connection (as discussed below); and, optionally, a message is displayed for the user (at the stationary display, PDA display, or both), such as "Dialing <address>. Insert related Document in Fax". According to another embodiment, upon completion of the transfer of data to the host 402, the interface pauses for the user to take action; and, optionally, a message is displayed for the user, such as "Ready to Dial <address>. Insert related Document in Fax and Press "GO". In exemplary embodiments, when multiple tasks are transmitted from the traveler 401 to the host 402 in a single session, the tasks will be initiated sequentially and either automatically (as first mentioned above in this paragraph) or at the user's initiative (e.g., pressing "GO" for each task). In such multiple task embodiments, displaying of the <address> or other prompting action is helpful to clue the user to insert the proper document in the fax device's tray.

Figure 7:
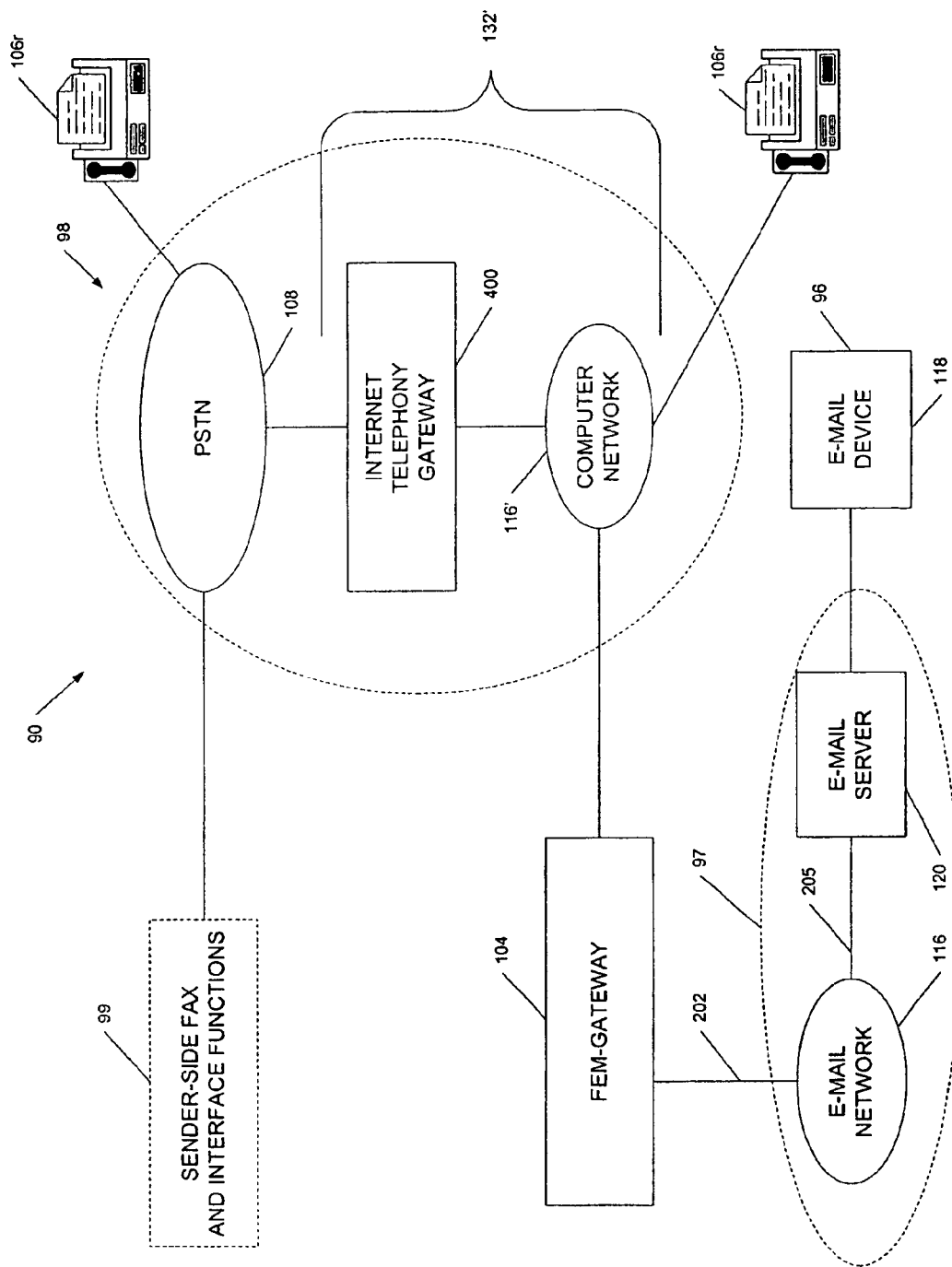
FIG. 7 is a schematic block diagram of one embodiment of an enhanced communication system in accordance with the present invention.

FIGS. 7 and 8 depict two alternate embodiments that acceptably represent the enhanced communication system 90, 90' in accordance with the present invention. It will be understood that other embodiments are acceptable, including, without limitation, embodiments incorporating any or all of the fax-to-email embodiments disclosed in the Incorporated Documents, modified as would be understood by reference to the present disclosure to accomplish the enhanced communication system of the present invention. The sender-side functions 99 are connected to the first communications network 98 by the communication link 107. By way of example, in the embodiment of FIG. 7, the first communication network 98 is seen as a combination of the public switched telephone network (PSTN) 108, the internet telephony gateway 400, and a computer network 116' (which is acceptably, though not necessarily, that same computer network described herein as the e-mail network 116). By way of further example, in the embodiment of FIG. 8, the first communication network 98 is seen as comprising only the PSTN 118. In these two example embodiments, the common communication line 107 is, for example, a central office ("CO") telephone line having dial tone generated thereon and having tip and ring capabilities all generated and managed by a local exchange carrier central office of the telephone network. Other networks are acceptable, and, regardless of the network used, it is desired that the network or an appropriate device associated therewith provide "dial tone" and appropriate other tones or signals as might be anticipated by the fax function 106.

In accordance with at least one embodiment of the enhanced communication system of the present invention, the enhanced communication system 90, 90' (referring again to FIGS. 7 and 8) includes a FEM-GATEWAY 104, second communication network 97 (including, for example, a worldwide computer network 116, such as the Internet, and e-mail server 120), each of which functions similarly to the that disclosed in the Incorporated Documents. Reference may be had to the Incorporated Documents for a more detailed understanding of this example embodiment of a FEM-GATEWAY 104.

The present invention provides flexibility for users to prepare tasks related to transmitting facsimile documents while away from the location of a fax device. A user can enter into the traveler 401, at any time or place, destination addresses (for example, email addresses or telephone numbers) to which it is desired to deliver a fax message. Then, placing related hardcopy documents into the scanner of the fax device/function 106/366b which is associated with the host portion 402 of the fax interface 102'''/366a, the addresses (with optional text data) are communicated from the traveling portion 401 to the host portion 402 via, for example, infrared signals. Subsequently, the scanned image data of the hardcopy document is communicated to the address entered at the PDA/traveler either through fax-to-email or through fax-to-fax, as discussed herein.

Upon receiving an error free transmission from a traveler 401, the interface host 402 initiates a network connection to the first communications network 98. If the destination address entered at the traveler 401 is a destination on the second communication network 97 (that is, for example, an email address), the interface host 402 recognizes the task as a fax-to-email task and initiates a connection to the first communications network 98 by dialing (or using appropriate technique based on the network configuration) the pre-established address (e.g., telephone number) for accessing a server (for example, at the FEM-GATEWAY 104) over the first communications network. If the destination address entered at the traveler 401 is a destination on the first communication network 98 (for example, a telephone number), the interface host 402 recognizes the task as a fax-to-fax task and initiates a connection to the first communications network 98 by dialing (or other appropriate technique) the phone number and releasing the communication line for direct connection of the "call" to the fax function 106. In an alternate embodiment, if the task is to be a fax-to-fax task, the host 402 passes the entered telephone number to the fax device 106, which, in such embodiment, is specially programmed to receive and self dial the received address. In the fax-to-fax task, the intention is to deliver a facsimile to a fax device 106r (or its proxy) on the first communications network. The fax-to-fax mode also finds usefulness in broadcast situations where most addresses are for email (fax-to-email) recipients but some require fax-to-fax delivery.

Figure 9:
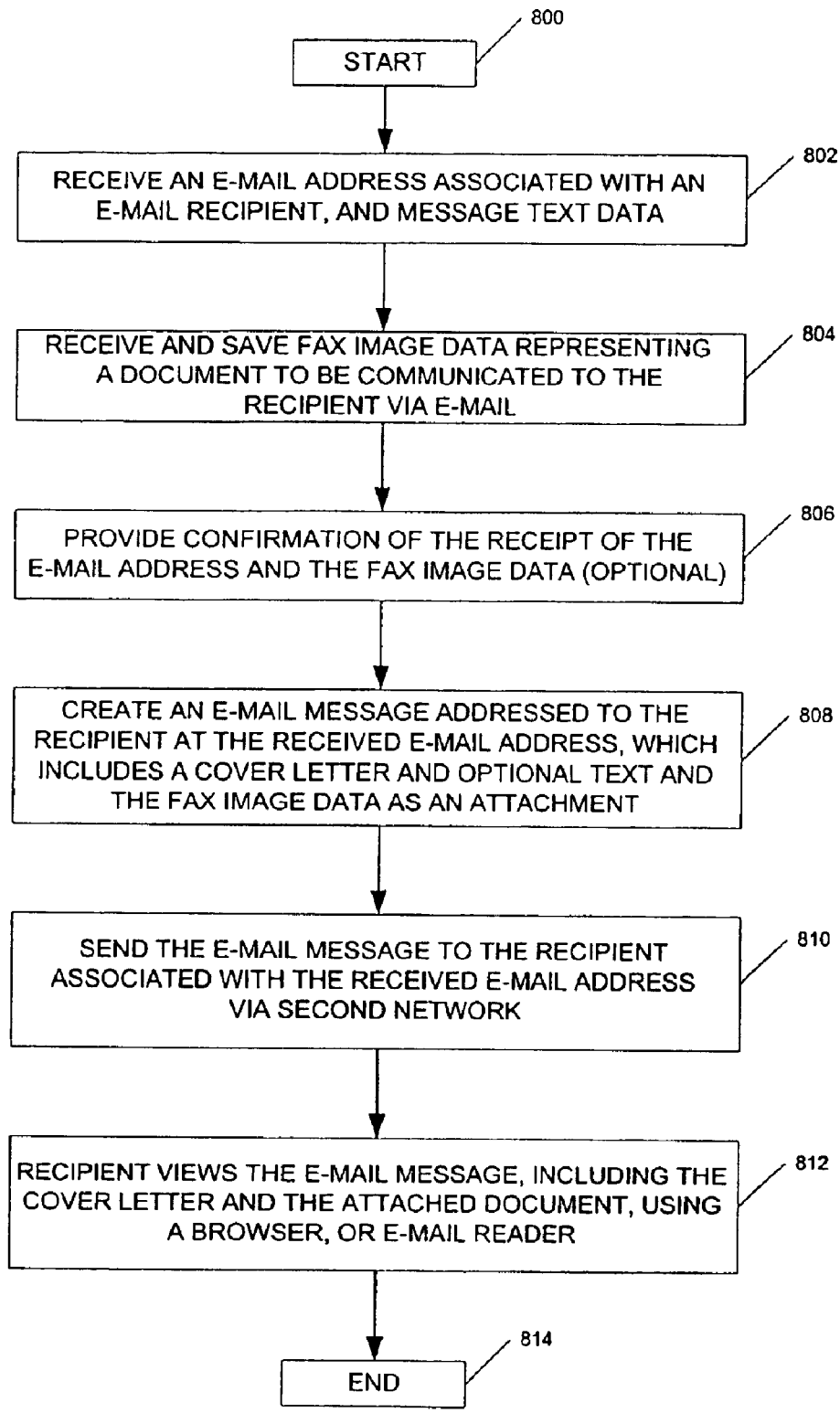
FIG. 9 is a flow chart depicting an overview of an exemplary embodiment of the fax-to-email communication method of the present invention.
Figure 10A:
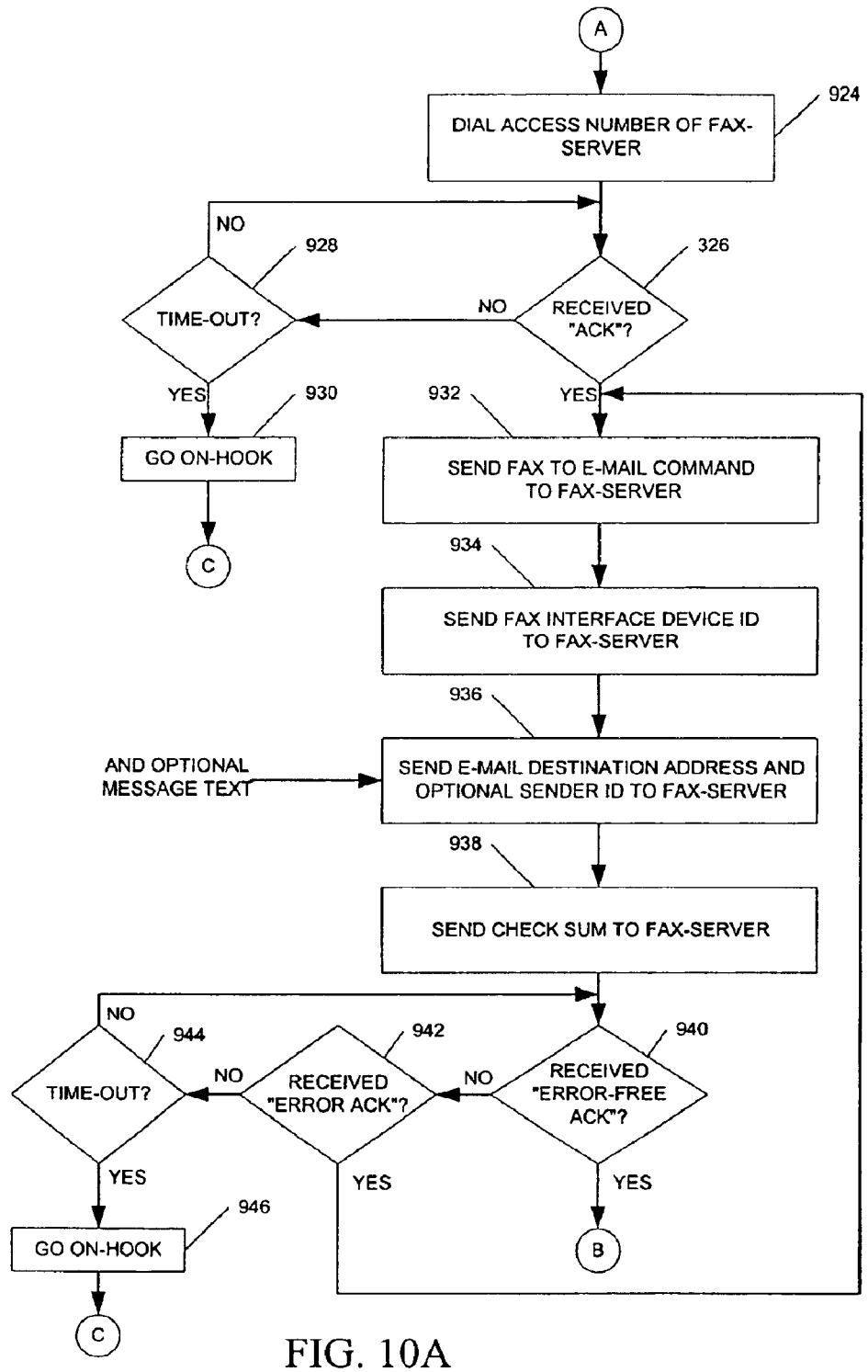
FIGS. 10A and 10B are a flow chart of the front end process depicting an exemplary embodiment of the communication process between interface host 402 and the fax server 110 at the FEM-GATEWAY 104—FIG. 10A depicting the host interfacing with the server, and FIG. 10B depicting the host receiving a message from the server.
Figure 10B:
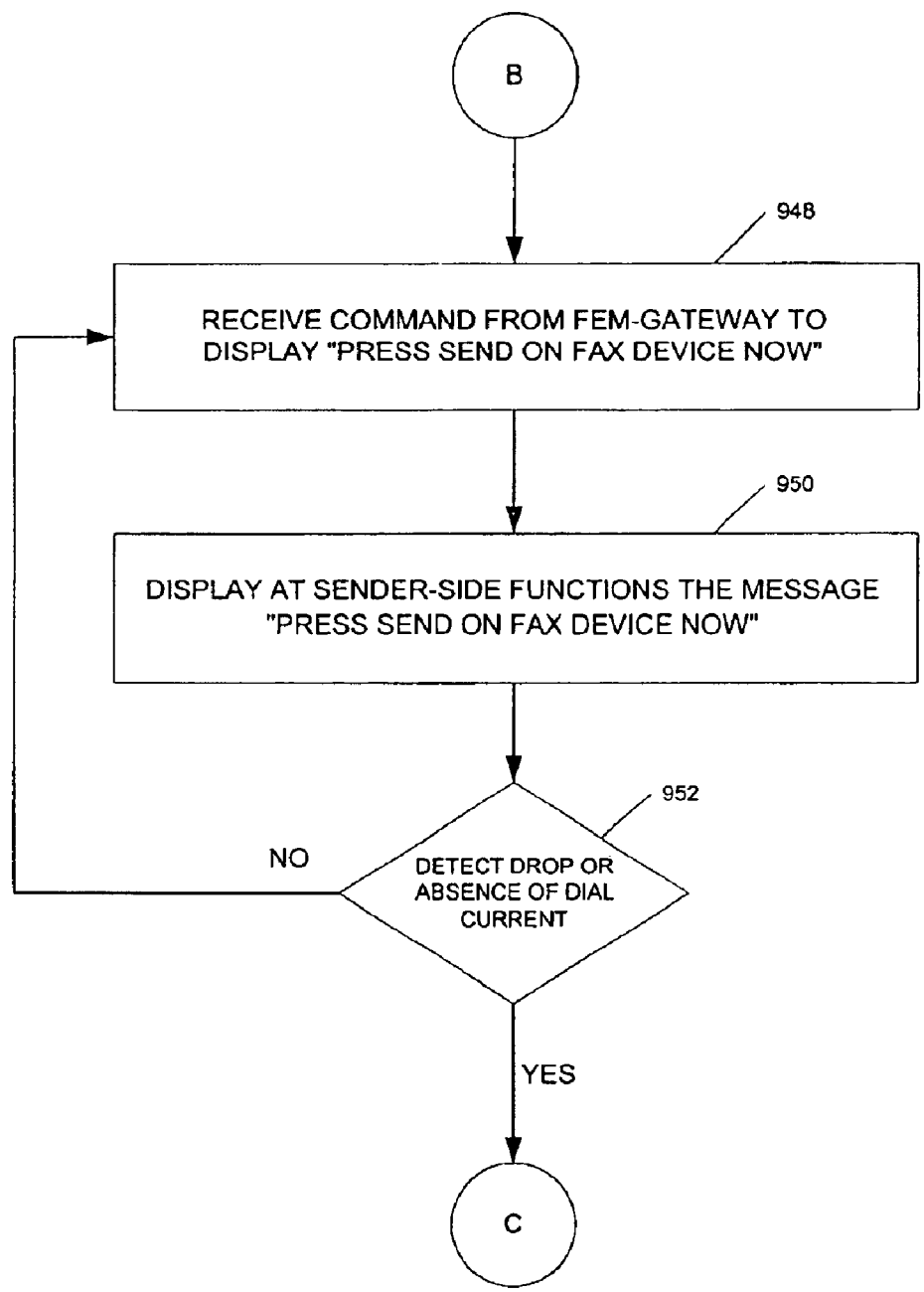
Figure 11A:
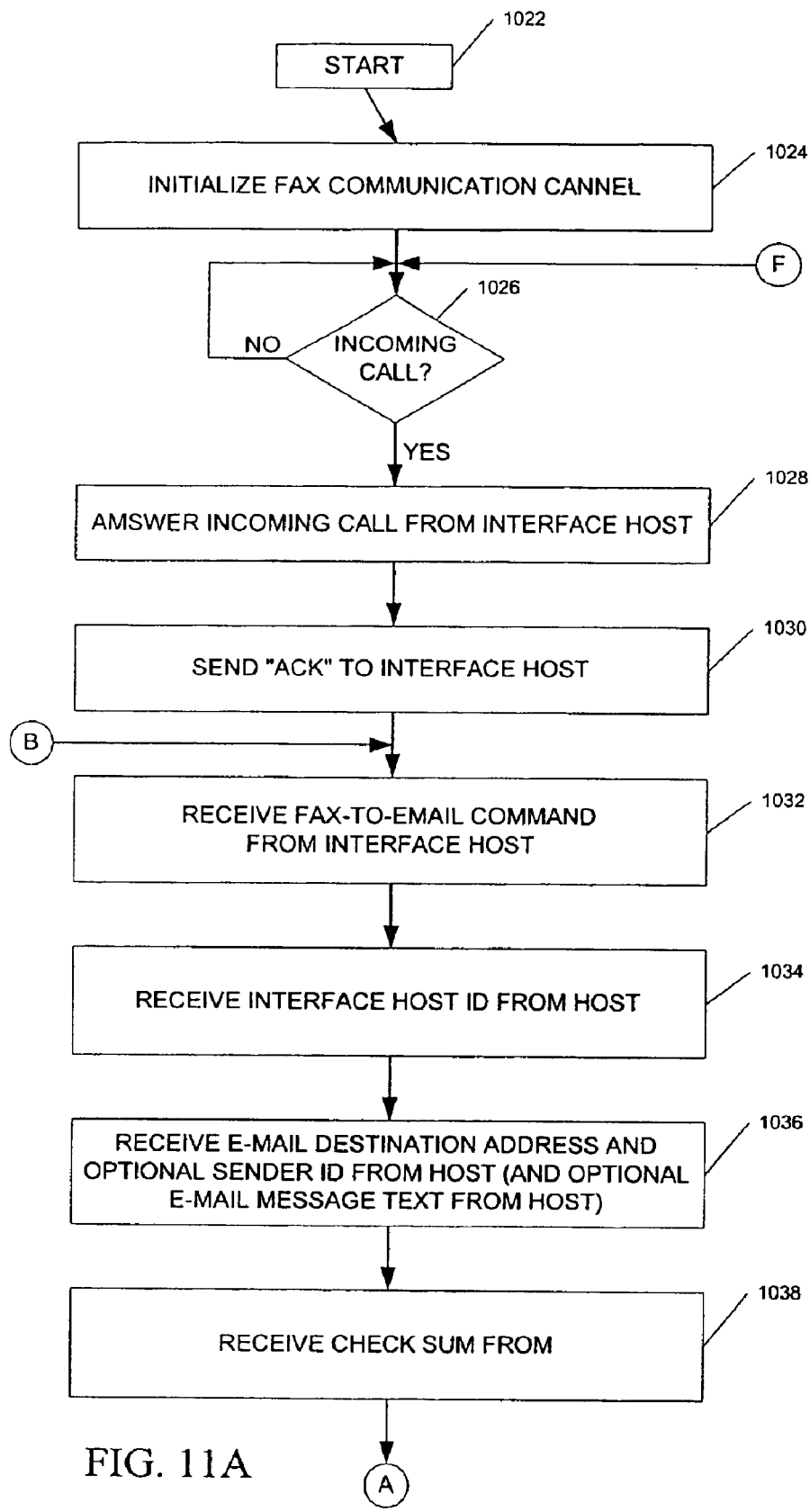
FIGS. 11A, 11B, and 11C are a flowchart depicting an exemplary embodiment of a process engaged in by the FEM-GATEWAY 104 during its participation in the fax-to-email task.
Figure 11B:
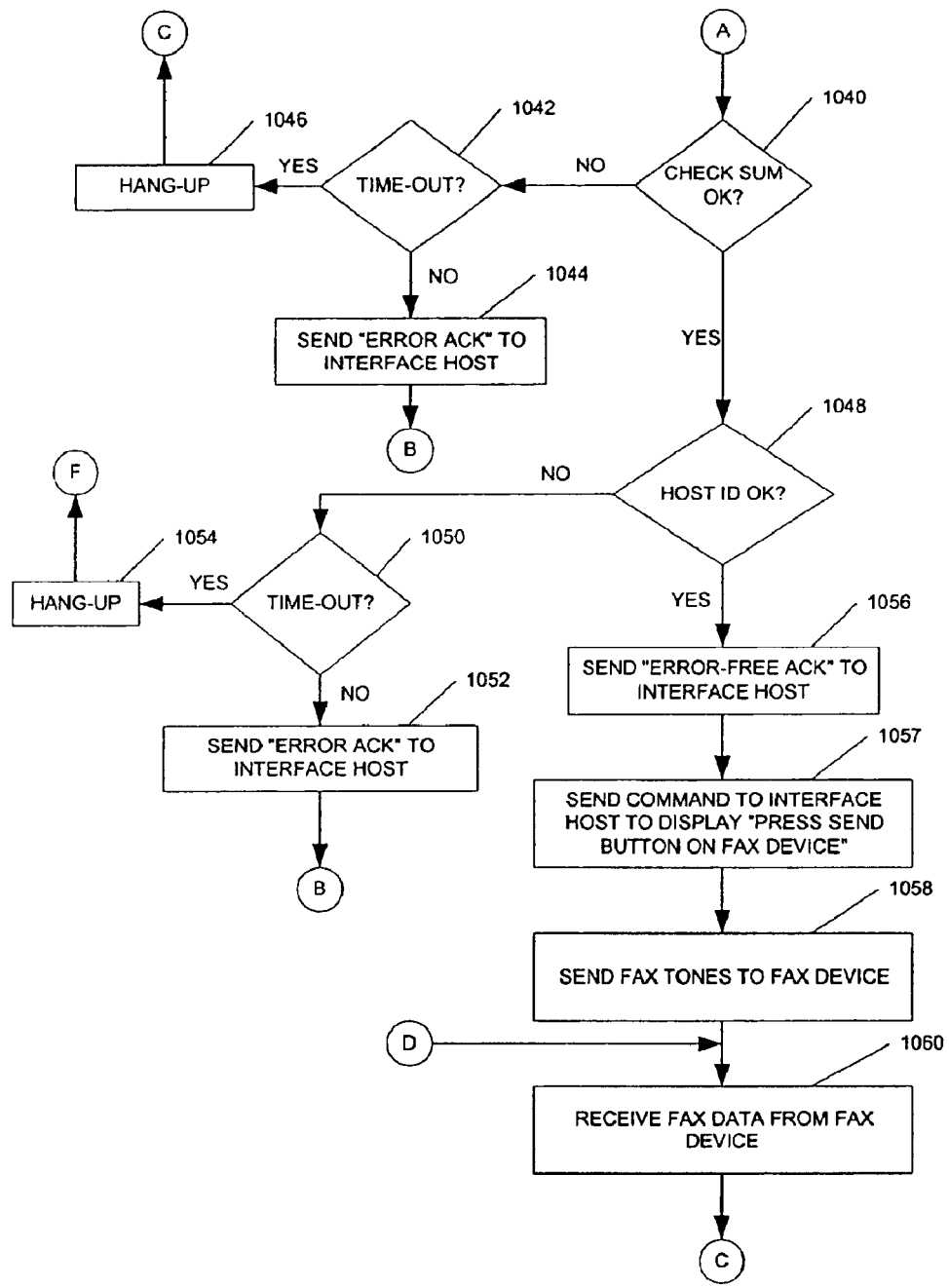
Figure 11C:
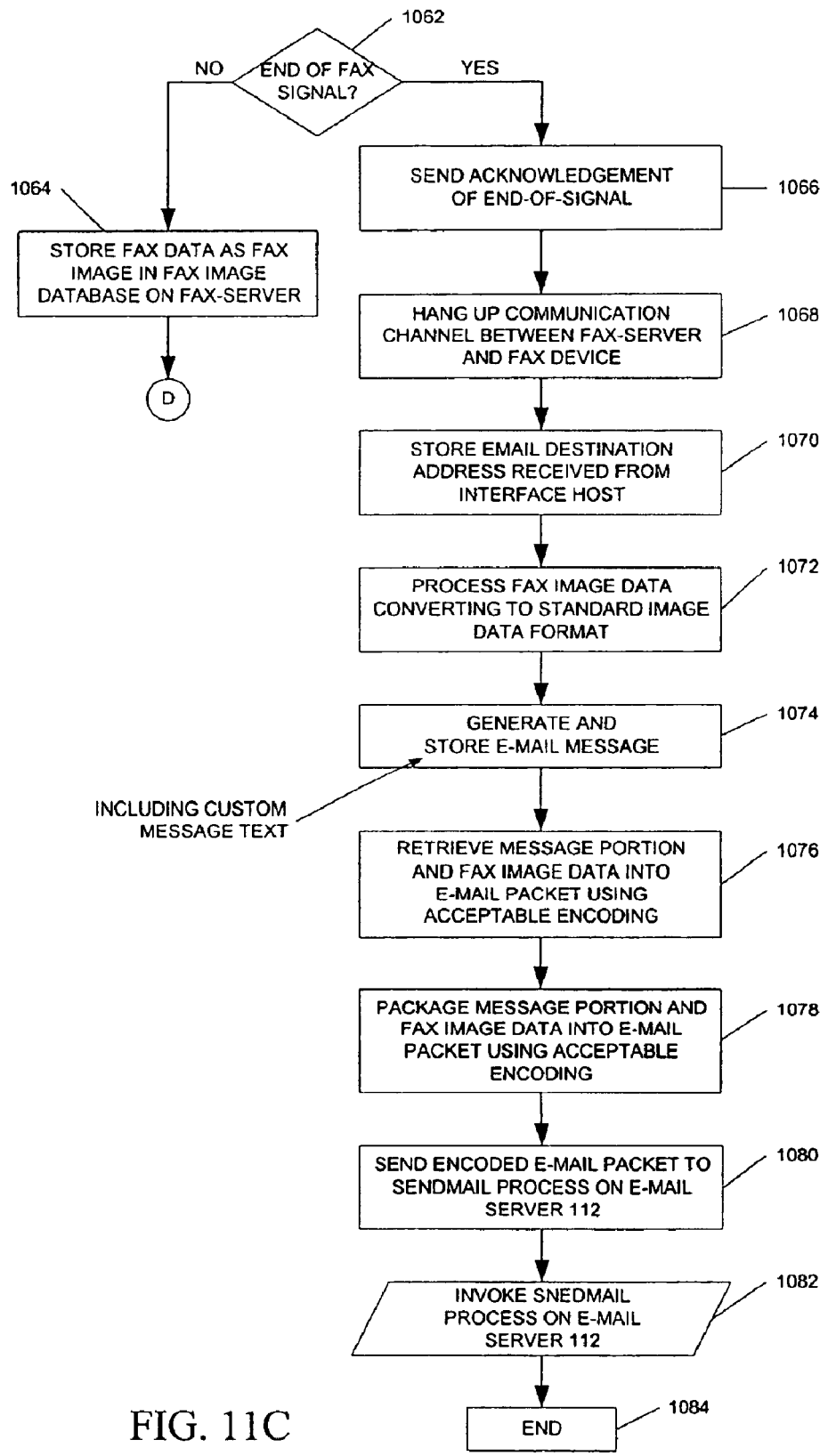

In the fax-to-email task "mode", after the host 402 initiates connection to the first communications network 98, the enhanced communication system of the present invention, in accordance with one embodiment, follows a process very similar to the process described in the Incorporated Documents to send the fax image to an e-mail address, yet modified as would be understood by reference to the present disclosure to accomplish the present invention. By way of example, but not limitation, the host 402 initiates an authentication routine with a server on the first network (using proprietary protocol), and processes the transaction with the intent of accomplishing delivery of the facsimile to a recipient's email address along the second communications network 97. One example of the process(es) utilized in accordance with one embodiment of the present invention to accomplish the fax-to-email task is shown in FIGS. 9–11. FIG. 9 is a flow chart depicting an overview of an exemplary embodiment of the fax-to-email communication method of the present invention. In FIG. 9, the process is shown beginning with the FEM-GATEWAY 104 receiving data from the host 402 (steps 802, 804), then creating an email message with the optional custom text incorporated and the fax image attached (step 808), then sends the email/fax message (step 810). FIGS. 10A and 10B are a flow chart of the front end process depicting an exemplary embodiment of the communication process between interface host 402 and the fax server 10 at the FEM-GATEWAY 104—FIG. 10A depicting the host interfacing with the server, and FIG. 10B depicting the host receiving a message from the server. FIGS. 11A, 11B, and 11C are a flowchart depicting an exemplary embodiment of a process engaged in by the FEM-GATEWAY 104 during its participation in the fax-to-email task. An understanding of these processes can be readily had by reference drawing figures and to the Incorporated Documents, and it is not deemed necessary to give greater detail here. In accordance with the present invention, the processes of this exemplary embodiment differ from that of the Incorporated Documents at least in that (ii) the communication between the sender-side interface 20 is accomplished through the host portion 402, while the traveler portion 401 remains available for transport and continued entry of task data, and (ii) there is included the entry and transmission of data, and in the creation and sending of the email message, custom text entered at the traveler 401 at message area 2006. Although step 950 and steps 1057 and 1058 identify process steps indicating a need to display the message "press send . . . ", it is understood that the actual step of pressing the send button is obviated in some embodiments in which the fax function is of the type that automatically sends upon receipt of fax tones (step 1058), such as CNG tones.

Figure 12:
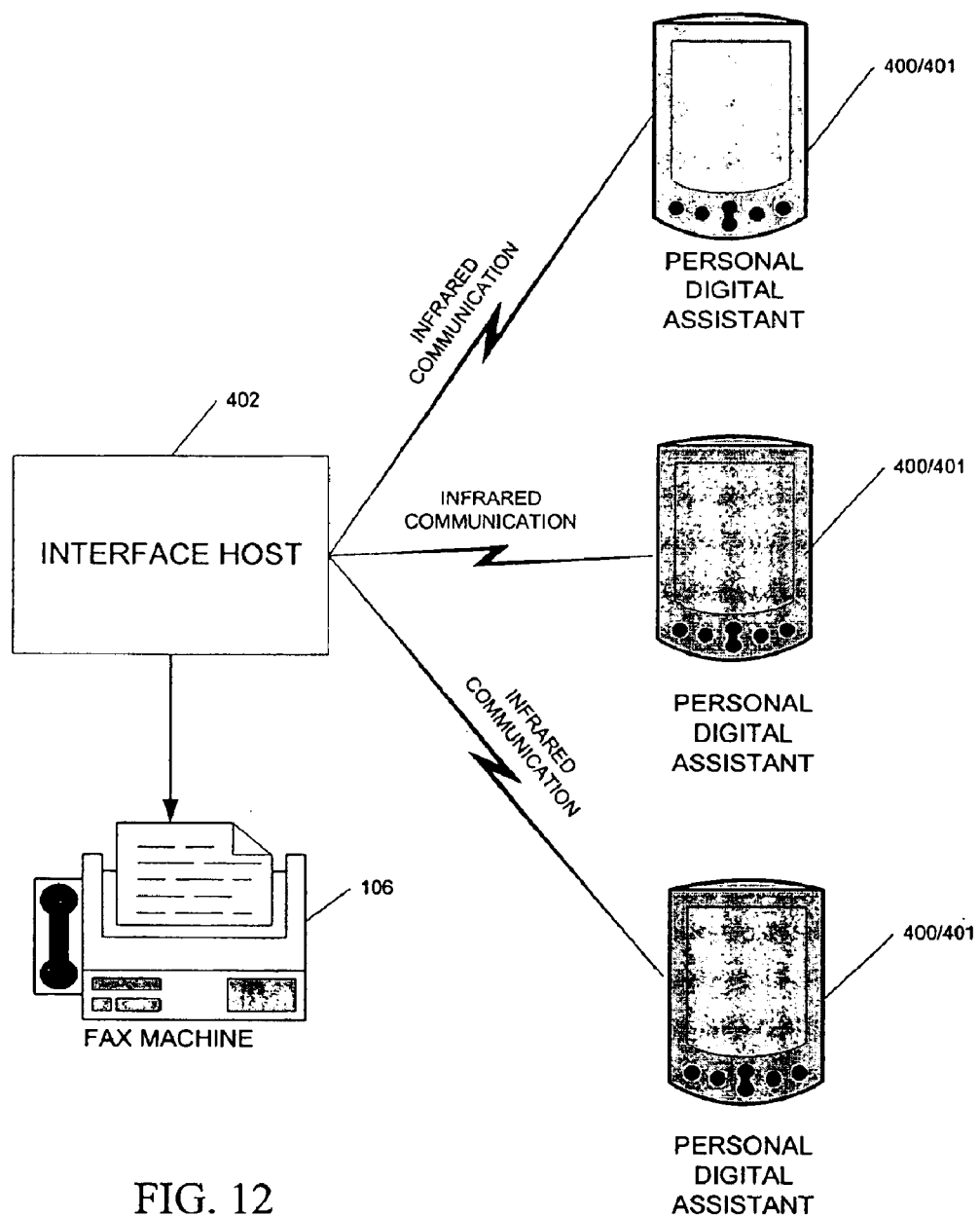
FIG. 12 illustrates an alternative embodiment of the sender-side functions where the interface supports multiple PDAs.

One goal of bifurcating the interface is the to permit dynamic user independence and a multiple billing options service enhancement as input into the PDA on a per transaction basis, and FIG. 12 is an embodiment that illustrates and supports this ability. In this embodiment, certain yet unmentioned functionalities that might have been incorporated into the single interface of the Incorporated Documents are now implemented and programmed into a PDA 400 application as part of the traveler 401. The functions such as billing, which requires information associated with individual users, can now be ported onto individual PDAs 400. This is especially practical in a setting where several users, each one having an individual account with the service provider for delivering facsimiles to e-mail, share a single interface host 402. Each user has his/her user identification and billing information programmed into his/her own PDA 400, and the user can then transmit the document and have it billed directly to his/her account Other information such as the destination for delivery confirmation notice and the location for archiving can also be individualized, i.e., each user can specify the destination where the notice of delivery confirmation is sent, and the location where the copies of the documents are stored.

Although the transmission between a traveler 401 and a host 402 is described using infrared signals, persons skilled in the art will appreciate the same concept implemented using radio signals or other communication mediums. Furthermore, it is acceptable, though less preferred, that the traveler 401 be a dedicated, specially programmed portable device, rather than the general purpose PDA with the resident traveler program as one of its resident programs. Also, as mentioned previously, alternate embodiments of the present invention provide for a single traveler 401 being able to authenticate to and interact with any of a plurality of hosts 402 in order that a user can prearrange tasks and have the tasks performed at any one of a plurality of sender-side locations. Further, it will be understood that the present invention, by virtue of its feature of accepting and transmitting custom text at the message area 2006 of the traveler 401, can be used to send an email absent a fax; since, in accordance with the invention, the FEM-GATEWAY 104 will generate and send a customized email message from the text transmitted from the host (received from the traveler), even if a fax is not sent to the fax server 110.

While the embodiments of the present invention that have been disclosed herein are the preferred forms, other embodiments of the present invention will suggest themselves to persons skilled in the art in view of this disclosure. Therefore, it will be understood that variations and modifications can be effected within the spirit and scope of the present invention and that the scope of the present invention should only be limited by the claims below. Furthermore, the equivalents of all means-or-step-plus-function elements in the claims below are intended to include any structure, material, or acts for performing the function as specifically claimed and as would be understood by persons skilled in the art of this disclosure, without suggesting that any of the structure, material, or acts are more obvious by virtue of their association with other elements.

What is claimed is:

1. A facsimile communication method, including the steps of:
   receiving at a personal data assistant a destination address;
   conveying via a first data exchange the received address from the personal data assistant to a host interface portion together with commands instructing the host interface portion to initiate a facsimile delivery;
   establishing, through the dialing of a destination address different from the destination address received during the receiving step, a communication session between the host interface portion and a forwarding facility;
   conveying the received address from the host interface portion to the forwarding facility, during the first communication session via a second data exchange independent of the first data exchange;
   conveying an image from a fax function associated with the host interface portion to the forwarding facility, during the first communication session via a third data exchange independent of the first and the second data exchanges; and
   delivering the image as an electronic file from the forwarding facility to the destination address received at the personal data assistant; and
   wherein the first data exchange involves at least a first protocol, and the second data exchange involves at least a second protocol different from the first protocol, and the third data exchange involves at least a third protocol different from each of the first and second protocols.

2. The method of claim 1, wherein the third protocol is a facsimile protocol.

3. A facsimile communication method, including the steps of:
   receiving at a personal data assistant an alphanumeric email address, being the address of a mailbox on a computer network;
   conveying via a first data exchange the received address from the personal data assistant to a host interface portion together with commands instructing the host interface portion to initiate a facsimile delivery;
   establishing a communication session between the host interface portion and a forwarding facility;
   conveying the received address from the host interface portion to the forwarding facility, dung the first communication session via a second data exchange independent of the first data exchange;
   conveying an image from the fax function associated with the host interface portion to the forwarding facility, during the first communication session via a third data exchange independent of the first and the second data exchanges; and
   delivering the image as an electronic file from the forward facility to the destination address received at the personal data assistant; and
   wherein the first data exchange involves at least a first protocol, and the second data exchange involves at least a second protocol different from the first protocol, and the third data exchange involves at least a third protocol different from each of the first and second protocols.

4. The method of claim 3, wherein the third protocol is a facsimile protocol.

5. A facsimile communication method, including the steps of:
   receiving at a personal data assistant a destination address;
   conveying via a first data exchange the received address from the personal data assistant to a host interface portion together with commands instructing the host interface portion to initiate a facsimile delivery;
   establishing, through the dialing of a destination address different from the destination address received during the receiving step, a communication session between the host interface portion and a forwarding facility;
   conveying the received address from the host interface portion to the forwarding facility, during the first communication session via a second data exchange independent of the first data exchange;
   conveying an image from a fax function associated with the host interface portion to the forwarding facility, during the first communication session via a third data exchange independent of the first and the second data exchanges; and
   delivering the image as an electronic file from the forwarding facility to the destination address received at the personal data assistant;
   the receiving step occurs while the personal data assistant is located away from the physical location of the fax function; and
   the step of conveying the received address to a host interface portion occurs while the host interface portion is linked to the fax function; and
   prior to the step of conveying the image but after the step of conveying the received address to the host interfere portion, including the step of prompting for the placement of a hardcopy into the scanner of the fax function.

6. The method of claim 5, wherein the establishing step comprises the steps of:

recognizing by the host interface portion that a fax-to-email task has been received from the personal data assistant requiring delivery of a facsimile message to an email address on a computer network; and dialing by the host interface portion of a pre-established address for accessing the forwarding facility.

7. The method of claim 5, further comprising the steps of:

receiving custom text at the personal data assistant while the personal data assistant is located away from the physical location of the fax function;

conveying the custom text from the personal data assistant to the host interface portion during the first data exchange; and conveying the custom text from the host interface portion to the forwarding facility during the second data exchange; and wherein the delivering step includes at least the steps of creating at the forwarding facility an email message containing the image as an attachment and, as part of the email message body, the custom text, and transmitting the email message from the forwarding facility to the destination address.

8. A facsimile communication method, including the steps of:

receiving at a personal data assistant an alphanumeric email address, being the address of a mailbox on a computer network;

conveying via a first data exchange the received address from the personal data assistant to a host interface portion together with commands instructing the host interface portion to initiate a facsimile delivery;

establishing a communication session between the host interface portion and a forwarding facility;

conveying the received address from the host interface portion to the forwarding facility, during the first communication session via a second data exchange independent of the first data exchange;

conveying au image from the fax function associated with the host interface portion to the forwarding facility, during the first communication session via a third data exchange independent of the first and the second data exchanges; and delivering the image as an electronic file from the forwarding facility to the destination address received at the personal data assistant;

the receiving step occurs while the personal data assistant is located away from the physical location of the fax function; and the step of conveying the received address to a host interface portion occurs while the host interface portion is linked to the fax function; and prior to the step of conveying the image but after the step of conveying the received address to the host interface portion, including the step of prompting for the placement of a hardcopy into the scanner of the fax function.

9. The method of claim 8, wherein the establishing step comprises the steps of:

recognizing by the host interface portion that a fax-to-email task has been received from the personal data assistant requiring delivery of a facsimile message to an email address on a computer network; and dialing by the host interface portion of a pre-established address for accessing the forwarding facility.

10. The method of claim 8, further comprising the steps of:

receiving custom text at the personal data assistant while the personal data assistant is located away from the physical location of the fax function;

conveying the custom text from the personal data assistant to the host interface portion during the first data exchange; and conveying the custom text from the host interface portion to the forwarding facility during the second data exchange; and wherein the delivering step includes at least the steps of creating at the forwarding facility an email message containing the image as an attachment and, as part of the email message body, the custom text, and transmitting the email message from the forwarding facility to the destination address.

11. A facsimile communication method, comprising the steps of:

entering into a portable traveler interface portion, at any place remote from the physical location of a scanner of a fax function and remote from the physical location of a host interface portion, a plurality of destination addresses including at least one email address and at least one telephone number;

communicating the plurality of destination addresses from the traveler interface portion to a host interface portion during a single communication session;

determining at the host interface portion each destination address of the plurality to be one of either an email address or a telephone number;

prompting by the host interface portion for placement of related hardcopy documents into the scanner of a fax function;

after the prompting step, generating image data from the hardcopy documents; and communicating the image data from the fax function to at least one address entered into the traveler interface portion.

12. The method of claim 11, and, in response to the determining step, if the destination address entered at the traveler interface portion is a telephone number, initiating a connection to a first communication network by the host interface portion dialing the destination address entered at the traveler interface portion to open a communication line, and releasing the communication line for direct connection to the fax function.

13. The method of claim 12, and, in response to the determining step, if the destination address entered at the traveler interface portion is an email address, initiating a connection to a forwarding facility by the host interface portion dialing a pre-established address for accessing a server, to open a communication line between the host interface portion and the forwarding facility, and releasing the communication line for direct connection between the forwarding facility and the fax function.

14. The method of claim 11, and, in response to the determining step, if the destination address entered at the traveler interface portion is an email address, initiating a connection to a forwarding facility by the host interface portion dialing a pre-established address for accessing a server, to open a communication line between the host interface portion and the forwarding facility, and releasing the communication line for direct connection between the forwarding facility and the fax function.

15. The method of claim 11, and, in response to the determining step, dialing by the host interface of an appropriate telephone number.

16. The method of claim 11, fit comprising the steps of:
  after the step of generating image data, prompting by the host interface portion for placement of another hardcopy document into the scanner of the fax function; and
  generating image data from the another hardcopy document.

17. The method of claim 16, further comprising the steps of:
  repeating the prompting and generating steps for a number of times equal to the number o destination addresses in the plurality of destination addresses.

18. The method of claim 16, wherein the communicating step includes at least the steps of:
  dialing by the host interface portion a pre-established address for accessing a forwarding facility and establishing a communication session with the forwarding facility;
  conveying generated image data and at least one received destination addresses to the forwarding facility;
  creating at the forwarding facility an email message containing the image as an attachment and, as part of the email message body, the custom text, and
  transmitting the email message from the forwarding facility to the destination address.

19. The method of claim 18, wherein the communicating step further includes at least the steps of:
  dialing by the host interface portion a destination address entered at the traveler interface portion to open a communication line; and
  transmitting image data to the destination address.

20. The method of claim 16, wherein the communicating stop includes at least the steps of:
  dialing by the host interface portion a destination address entered at the traveler interface portion to open a communication line; and
  transmitting image data to the destination address.

21. The method of claim 18, wherein the communicating step further includes at least the steps of passing by the host interface portion to the fax function a destination address entered at the traveler interface portion;
  dialing by the fax function the destination address entered at the traveler interface portion to open a communication line; and
  transmitting image data to the destination address.

22. The method of claim 16, wherein the communicating step includes at least the steps of:
  passing by the host interface portion to the fax function a destination address entered at the traveler interface portion;
  dialing by the fax function the destination address entered at the traveler interface portion to open a communication line; and
  transmitting image data to the destination address.

23. The method of claim 11, wherein the traveler interface portion is a specially programmed personal data assistant.

24. The method of claim 11, wherein the host interface portion is associated with the fax function at which the hardcopy documents are scanned.

25. The method of claim 24, wherein the host interface portion is connected to the fax function.

26. The method of claim 25, wherein said host portion is physically linked to but functionally separate from, the fax function.

27. The system of claim 25, wherein said host portion is integrated with, but functionally separate from, the fax function.

28. The method of claims 11, wherein each destination address of the plurality of destination addresses is entered either in a syntactically correct format as recognized by a telephone network or in a syntactically correct format as recognized by a compute network.

* * * * *